ated Mar. 8, 1910.

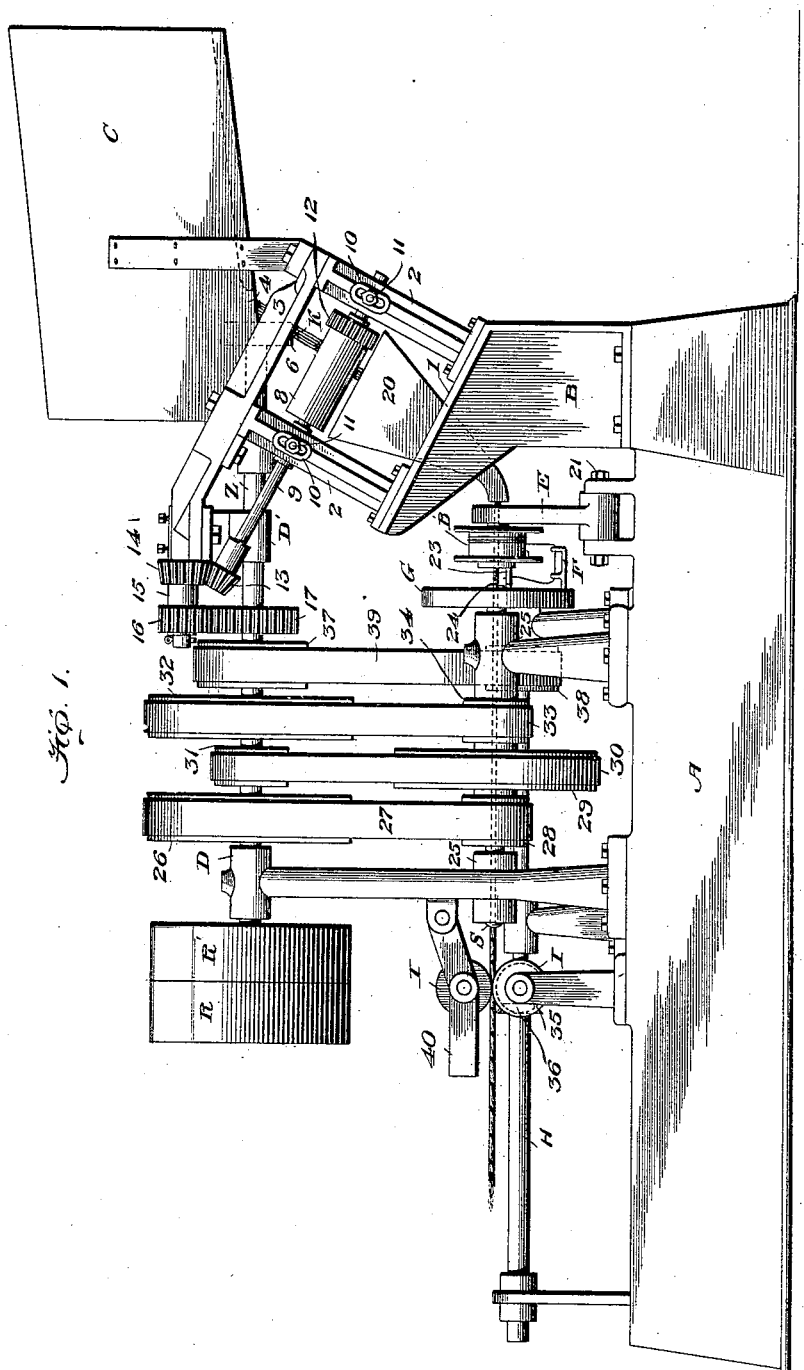

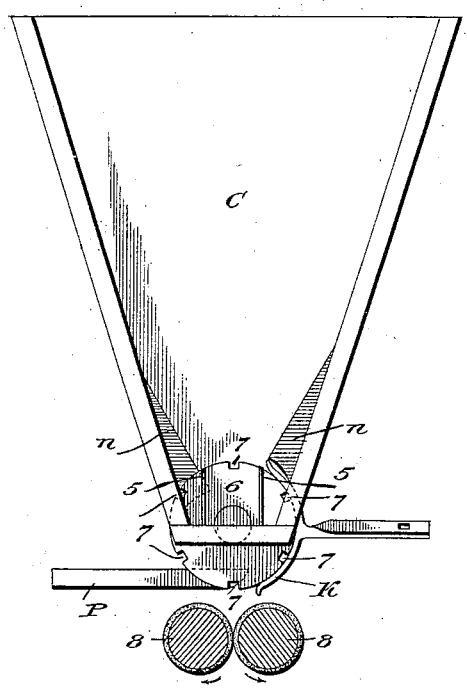
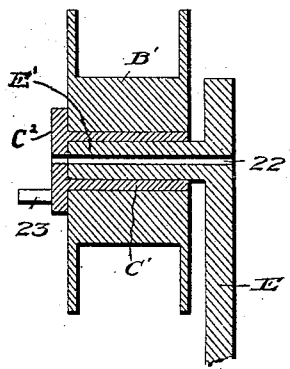
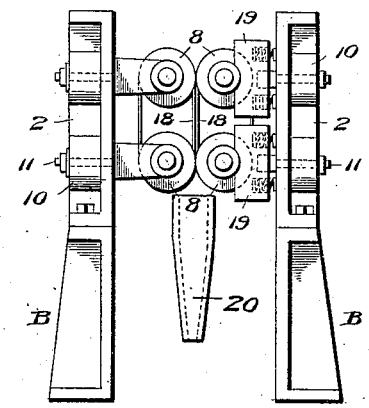

UNITED STATES PATENT OFFICE.

EDWARD W. GOODRICK, OF APPLETON, WISCONSIN, ASSIGNOR TO AMERICAN GRASS TWINE COMPANY, OF ST. PAUL, MINNESOTA, A CORPORATION OF DELAWARE.

MACHINE FOR MAKING GRASS TWINE.

951,390.   Specification of Letters Patent.   Patented Mar. 8, 1910.

Application filed May 17, 1902. Serial No. 107,823.

*To all whom it may concern:*

Be it known that I, EDWARD W. GOODRICK, a citizen of the United States of America, residing at Appleton, in the county of Outagamie and State of Wisconsin, have invented certain new and useful Improvements in Machines for Making Grass Twine, of which the following is a full, clear, and exact specification.

My invention relates to a machine for making grass twine.

The object of the invention is to provide a machine which is simple in construction, efficient in operation and economical in manufacture.

My invention consists substantially in the construction, combination, location and arrangement of parts, all as will be more fully hereinafter set forth, as shown in the accompanying drawings, and finally pointed out in the appended claims.

Referring to the accompanying drawings, and to the various views and reference signs appearing thereon,—Figure 1 is a view in side elevation of a machine embodying the principles of my invention. Fig. 2 is a detail view looking into the hopper, and indicating the feed rolls below the hopper in transverse section. Fig. 3 is a detail sectional view of the spool for the winding cord or thread. Fig. 4 is a detail end view showing a modification of the feed mechanism embodying the principles of my invention.

The same part is designated by the same reference sign wherever it occurs throughout the several views.

In the manufacture of grass twine it is desirable to turn out a product of uniform strength, size and character throughout. For this result it is necessary to have the individual spears of grass break joints uniformly throughout the length of the cord; and furthermore, to have the same proportion of coarse and fine spears in any cross section which may be taken throughout the said length. Inasmuch, however, as the raw material comes in a very heterogeneous form with bunches of coarse and fine grass irregularly mixed together, it would be necessary for perfect results to employ a feeding means which would promiscuously draw individual spears of grass from separate points throughout the body of the raw material in the hopper, and feed them successively forward in uniform spaced relation. A cord so produced would tend to average the irregularities of the mass of grass or fibers and would approach absolute uniformity as a limit as the number of fibers or spears indefinitely increased. In practice this result can be only approximately attained, but it is the purpose of this invention to provide means by which it can be attained for all practical purposes, and in a manner superior to that of any means hitherto employed.

Referring to the accompanying drawings, reference sign A designates the base or frame of the machine, having a raised portion or platform B at one end. The platform B, if desired, and preferably, may be inclined to the plane of the base, and thereby support in inclined relation the various parts of the feed mechanism.

2, 2, designate standards or uprights upon the platform B, carrying at their upper ends a cross frame 3, to which I attach the support or hopper C for the pile of grass or fibers.

The hopper C preferably comprises a narrow V-shaped receptacle open at its front end and having an opening 4 in the rear portion of its bottom in which is disposed the feed disk 6. A series of pins 5, 5, serve to assist in drawing the spears of grass or the like against the disk 6. I arrange the feed disk 6 upon the end of the main shaft Z extending longitudinally of the frame and journaled in bearings D D' thereon. It is obvious, however, that the feed disk 6 may be supported and driven in any suitable or desired manner. Upon the main shaft Z, I also secure a gear wheel 17, meshing with a pinion 16 upon a sleeve 15 revolubly supported upon a stud shaft extending from the cross frame 3. Upon the sleeve 15 is also mounted a bevel gear 14 meshing with a bevel pinion 13 upon a shaft 9. The shafts 9, 9, are journaled in boxes or bearings 10, adjustably secured as at 11 to the uprights 2 of the frame. Upon each of these shafts 9, 9, I mount one of a pair of coöperating feed rolls 8, 8, which are provided with intermeshing gears 12 by which they are made to revolve in unison. By this arrangement the feed rolls 8 are disposed in inclined relation with respect to the hopper C and the feed disk 6 therein. The feed rolls may of course be supported and driven in any desired manner, and I do not wish to be limited or restricted to the particular means shown. The feed rolls may be roughened or faced with rubber or other frictional or yielding material, if desired. Below the feed rolls 8, I employ a cone or funnel 20 with a curved spout or orifice directed longitudinally of the machine. The grass from the hopper is directed into the funnel 20 by means of the feed rolls 8.

Referring now to the particular means by which the heterogeneous mass of grass or fiber is fed in a uniform stream from the hopper into the funnel, attention is particularly directed to Fig. 2. It will be seen that I provide uniformly spaced notches upon the periphery of the disk 6, and means coöperating with these notches whereby the spears of grass or fiber are collected therein and bent or deflected downward from the hopper. In the particular arrangement shown, to which, however, I do not desire to be limited or restricted, I arrange a number of small rectangular notches 7 in the disk, and guide blocks n n coöperating therewith to direct the grass into proper engaging relation. K designates a guide comprising a curved strip or blade extending in close relation to and parallel with the periphery of the said disk 6. I arrange the blade K to terminate at a point above the feed rolls 8, and beyond said point, suitably mounted on the frame, I arrange a part or stripper P, which is shaped to force the grass or fibers out of the notches 7. For this purpose the stripper P may comprise a simple projecting rod having a curved end, and extending substantially tangent to the disks 6. The operation of this portion of my device is as follows: The grass or fibers are thrown into the hopper C and are crowded down into the narrow bottom thereof by virtue of the weight of the mass of those above. At the forward end of the hopper the fibers rest against the periphery of the disk 6 throughout the exposed portion of the same. As the disk revolves and the notches 7 pass under the fibers the forward ends of the latter are collected and bent or deflected downward by the disk, being held thereagainst by the curved blade K above described. As they are successively ejected from the disk by the stripper P they are grasped in the bite of the feed rolls 8 and drawn downward into the funnel 20. At the time the ends of the fibers are presented to the feed rolls 20 the main portion of the fiber is still in the hopper, the action of the disk having been simply to deflect or bend certain selected fibers downward as far as the bite of the feed rolls, without any action of withdrawing the fiber from the hopper. The disk therefore constitutes a selector mechanism, and the feed rolls the withdrawing mechanism proper. The diagonal disposition of the feed rolls allows them to grasp the deflected fiber in a perpendicular or squarely disposed relation, and feed it uniformly forward in a fixed plane, i. e., the line of feed of the rolls. The fibers presented to the rolls by the selector mechanism are so timed as to give a staggered or break-joint relation. This occurs by reason of the uniform rotation of the disk 6 and the regular spacing of the notches. A single fiber, or a very small quantity of grass or fibers, is collected by each notch, and each fiber or little bundle breaks joints with its preceding and succeeding one in the finished product. Furthermore, the composition of the finished twine is likely to be uniform at all points of its length, since the notches 7 are liable to pick their fibers at any point indiscriminately of the arc of contact of the disk therewith. Accordingly, the fibers are selected promiscuously and do not have a tendency to accord with the kind of grass in a particular spot. As the grass or fibers pass downward through the funnel 20 they are concentrated by the latter and issue at the spout thereof in a uniform, compact and forwardly-directed little stream or bundle.

I will now describe a form of mechanism embodying the principles of my invention by which the above described stream or bundle of fibers issuing from the funnel 20 are wound and formed into the finished twine or product. Opposite the spout of the funnel 20, I arrange a spool carrier E, illustrated particularly in Fig. 3. This preferably, and as shown, comprises an arm pivoted to the main frame at 21, and adapted to rock to one side for renewal or adjustment of the spool. 22 designates an opening or orifice extending through the arm E and through a stud or projecting shaft E' upon one side thereof. Revolubly mounted upon the said stud, I arrange a sleeve or collar C', which forms a core or spindle upon which the thread or twine carrying spool B' is mounted. The sleeve is provided with an end flange $C^2$, which limits the endwise movement of the spool on the sleeve and the sleeve on its stud or shaft. 23 designates a pin upon the flange $C^2$, for a purpose presently to be described.

Extending longitudinally of the main frame and disposed in alinement with the opening 22 above described, I arrange a hollow shaft S journaled in bearings 25 25 upon the main frame. This shaft is rotated in any desired manner; for example, by a series of belts 27, 30 and 33, extending over pulleys 26, 28, 29, 31, 32, 34, respectively placed on shaft S and the main driving shaft Z. The pulleys 26 and 34 are tight on their shafts, while the pulleys 28 and 29, and also the pulleys 31 and 32, are loose on their respective shafts. When, now, the main driving belt is shifted from the loose pulley R' to tight pulley R pulley 26 is rotated, which drives pulley 28 through belt 27 at increased speed. This rotates pulley 29, which drives pulley 31 through belt 30 at still greater speed. This rotates pulley 32, which in turn drives pulley 33 upon the hollow shaft S at a still further increased speed over that of the initial driving pulley R.

G designates a crank disk carried upon the shaft S, and having a crank pin 24 with an eccentricity corresponding to that of the pin 23. Accordingly, when the shaft S is rotated the spool-carrying sleeve C' is rotated in unison therewith, and the two crank pins are pressed into close contacting relation.

F designates a thread-carrier supported by the disk G. By this means the thread is drawn outward from the spool and then directed inward between the crank pins which form a tension device. It is obvious that any desired method of guiding and tensioning the thread may be employed, and I do not desire to be limited or restricted to the particular details shown and described.

In operation the bundle of grass or fibers passes through the arm E and the hollow shaft S, traversing the open space between the two. At this point the thread is applied, and as the thread-carrying means revolve rapidly while the grass moves forward, it is obvious that the thread will be wound spirally around the grass forming the finished twine or product.

In order to remove the twine as fast as produced, I provide means, for example, the withdrawing rolls I I having a grooved or friction periphery in alinement with the hole through the shaft S. I provide bevel gears 35 36 by which the lower roll may be positively driven from a longitudinal countershaft H receiving its motion from drive shaft Z through pulleys 37, 38, and belt 39. The upper roll may be provided with pressure means for example a weighted lever 40 by which it is held in yielding engagement with the lower roll.

It is obvious that many different ways may suggest themselves to persons skilled in the art for applying the winding thread and arranging the feeding devices, and still fall within the spirit and scope of my invention. For example the feed rolls 8 may be modified in the manner illustrated in Fig. 4. In this case I provide two pairs of rolls and arrange belts 18 of rubber or other yielding, rough or frictional material to connect the corresponding rollers on each side. 19 19 designate yielding journal boxes or bearings whereby the rollers are held in yielding or spring-pressed relation. In like manner, the various other portions of the machine may be modified in many different ways and yet embody the principles of my invention. I do not desire, therefore, to be limited or restricted to the precise details shown and described. But Having now set forth the object and nature of my invention, and a construction embodying the principles thereof, what I claim as new and useful and of my own invention, and desire to secure by Letters Patent, is:

1. In a device of the class described, a disk arranged adjacent to a pile of grass or fibers and having its axis extending in a direction substantially parallel with the direction of said fibers, the disk contacting with said fibers at its peripheral portion, and having means for engaging said fibers, and a pair of diagonally disposed rolls for withdrawing said fibers when released by the disk and into the bite of which the fibers are deflected, as and for the purpose set forth.

2. In a device of the class described, a hopper, a notched disk arranged to deflect fibers from the hopper, a pair of feed rolls having their axes inclined to that of the disk and into the bite of which the fibers are deflected, and a funnel disposed beyond the feed rolls, as and for the purpose set forth.

3. In a device of the class described, fiber deflecting and forwarding mechanism, a funnel having an issuing orifice, a rotary hollow shaft in alinement with said issuing orifice, and a crank pin carried by said shaft and bearing against a rotatable spool-carrying member, the contacting surfaces of said parts forming a tension device for the thread, as and for the purpose set forth.

4. In a device of the class described, a main drive shaft, a feeding disk upon said shaft, a gear upon said shaft, diagonally disposed feed rolls driven from said gear, and pulleys upon said shafts having belts and a hollow shaft carrying thread winding mechanism, as and for the purpose set forth.

5. In a device of the class described, fiber deflecting and forwarding mechanism, a normally stationary hollow shaft or stud carrying a revoluble sleeve and spool, and a revoluble shaft in alinement with said stationary shaft and carrying winding means and arranged to rotate said spool, as and for the purpose set forth.

6. In a device of the class described, fiber deflecting and forwarding mechanism, a normally stationary hollow shaft or stud carrying a revoluble sleeve and spool, a revoluble shaft in alinement with said stationary shaft and carrying winding means, and a crank pin carried by said revoluble shaft and coöperating with a crank pin on said sleeve to form a tension device, as and for the purpose set forth.

In testimony whereof, I have signed my name to this specification in the presence of two subscribing witnesses.

EDWARD W. GOODRICK.

Witnesses:
 JOHN BOTTENSEK,
 F. E. SAECKER.